United States Patent [19]
Batelaan et al.

[11] Patent Number: 6,103,885
[45] Date of Patent: *Aug. 15, 2000

[54] METHOD OF MAKING AMIDE MODIFIED CARBOXYL-CONTAINING POLYSACCHARIDE AND FATTY AMIDE-MODIFIED POLYSACCHARIDE SO OBTAINABLE

[75] Inventors: Jan Gerardus Batelaan, Westervoort; Peter Marten Van Der Horst, Arnhem, both of Netherlands

[73] Assignee: Akzo Nobel NV, Arnhem, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/530,127
[22] PCT Filed: Mar. 28, 1994
[86] PCT No.: PCT/EP94/00990
  § 371 Date: Nov. 14, 1995
  § 102(e) Date: Nov. 14, 1995
[87] PCT Pub. No.: WO94/24169
  PCT Pub. Date: Oct. 27, 1994

[30] Foreign Application Priority Data

Apr. 15, 1993 [EP] European Pat. Off. .............. 93201097

[51] Int. Cl.[7] ............................... C07H 5/04; C07H 1/00; C08B 11/00; C08B 31/00
[52] U.S. Cl. ............................ 536/18.7; 536/30; 536/43; 536/45; 536/46; 536/52; 536/55.3; 536/119; 536/124
[58] Field of Search ............................... 536/18.7, 30, 43, 536/45, 46, 52, 55.3, 119, 124

[56] References Cited

U.S. PATENT DOCUMENTS

| | | | |
|---|---|---|---|
| 3,928,316 | 12/1975 | Jordan et al. | 536/52 |
| 4,228,277 | 10/1980 | Landoll et al. | 536/90 |
| 4,243,802 | 1/1981 | Landoll | 536/91 |
| 4,933,440 | 6/1990 | d'Hinterland et al. | 536/53 |
| 4,952,684 | 8/1990 | Yalpani et al. | 536/18.7 |
| 4,963,664 | 10/1990 | Yalpani et al. | 536/18.7 |
| 4,988,806 | 1/1991 | Grüning et al. | 536/98 |
| 5,472,951 | 12/1995 | Saitoh et al. | 514/54 |

FOREIGN PATENT DOCUMENTS

| | | | |
|---|---|---|---|
| 189935 | 8/1986 | European Pat. Off. | C08B 11/193 |
| 512319 | 11/1992 | European Pat. Off. | C08B 5/00 |
| 566118 | 10/1993 | European Pat. Off. | C08B 37/00 |
| 9424169 | 10/1927 | WIPO . | |

OTHER PUBLICATIONS

The Chemistry of Amides, J. Zabicky, ed (Interscience Publishers, 1970), pp. 105–109.
Compendium of Organic Synthetic Methods, I.T. Harrison et al., Wiley–Interscience, 1971, pp. 206–207, 213–214., and 217.

Organic Chemistry, Second Edition, D.C. Heath and Company, 1989, pp. 581–582.

The Chemistry of Carboxylic Acids and esters, S. Patai, ed., Interscience–Publishers, 1969, pp. 408–410 and 420–421.

Chemical Abstracts, vol. 115, 45150 (1991).

Chemical Abstracts, vol. 106, 107845 (1987).

Chemical Abstracts, vol. 109, 134782 (1988).

Chemical Abstracts, vol. 100, 73897 (1984).

Chemical Abstracts, vol. 88, 91208 (1978).

M. Yalpani et al., "Some Chemical and Analytical Aspects of Polysaccharide Modifications. I. Nitroxide Spin–Labelling Studies of Alginic Acid, Cellulose, and Xanthan Gum", Canadian Journal of Chemistry, vol. 59 (1981), pp. 3105–3119.

Chemical Abstracts, vol. 106, 34867 (1986) with full text Russian publication attached.

G.A. Petropavlovsky, "the Reaction of Carboxymethylcellulose with Aliphatic Diamines", Cellulose Chemistry and Technology, 18, 283–292 (1984).

Frontiers in Biomedicine and Biotechnology, vol. 1, issued 1993, Yalpani et al, "Syntheses of New Glycan Amine and Amide Derivatives", pp. 235–245.

Carbohydrate Research; vol. 16, No. 1, issued 1971, Danishefsky et al, "Conversion of Carboxyl Groups of Mucopolysaccharides into Amides of Amino Acid Esters", pp. 199–205.

*Primary Examiner*—Howard C. Lee
*Assistant Examiner*—Everett White
*Attorney, Agent, or Firm*—Richard P. Fennelly

[57] ABSTRACT

The Invention pertains to a process for the amidation of a material having at least one carboxyl-containing polysaccharide. The provided process involves a first step in which the carboxyl groups are reacted with an ammonium donor of the general formula >NH to form the corresponding polysaccharide carboxyl ammonium salt, and a second step in which the polysaccharide carboxyl ammonium salt is heated so as to convert the ammonium groups into the corresponding amido groups. The invention also pertains to fatty amide modified carboxyl-containing polysaccharides, and particularly to fatty amide modified carboxymethyl cellulose. The products in accordance with the invention can be widely employed, e.g. in the field of biodegradable plastics, as anti-redeposition agents for synthetic fibers, as polymeric emulsifiers, as pigment dispersing agents, in cosmetic applications, as thickeners, as oil drilling fluids, as superabsorbers, and in mineral processing.

9 Claims, No Drawings

METHOD OF MAKING AMIDE MODIFIED CARBOXYL-CONTAINING POLYSACCHARIDE AND FATTY AMIDE-MODIFIED POLYSACCHARIDE SO OBTAINABLE

This application is a 371 of PCT/EP94/00990, filed Mar. 28, 1994.

The invention pertains to a process for the amidation of a material having at least one carboxyl-containing polysaccharide. The invention also pertains to hydrophobe modified carboxyl groups-containing polysaccharides so obtainable.

A process for the amidation of a material having at least one carboxyl-containing polysaccharide has been disclosed in U.S. Pat. No. 4,963,664 to Yalpani et al. In the described process a material having at least one carboxyl-containing polysaccharide is reacted with an ammonium donor having the general formula >NH in order to convert the carboxyl groups into amide groups. This method, however, appears unviable. The exemplified process involves unsuitably long reaction times and displays a low conversion, which, all in all, prohibits employing the process on a commercially acceptable scale. Furthermore, the disclosed method, while yielding quaternary ammonium modified polysaccharide, even fails to produce the desired result of amidation. Typical ammonium donors disclosed are ammonia, ammonium salts, primary and secondary amines, polypeptides, proteins, etc. While Yalpani thus directs the man of ordinary skill in the art to employing numerous amines as the ammonium donor, the disclosure is silent on such modification as will render the carboxyl groups-containing polysaccharides hydrophobic.

From U.S. Pat. No. 4,988,806 (Grüning) it is known to esterify carboxymethyl cellulose (CMC) with alkyl chloride, and react the ester so obtained with a diamine, in order to form an aminamide of CMC, which is subsequently quaternized. The process is relatively complicated, and it would be desirable to avoid the use of alkyl chloride, which is an unpleasant and relatively expensive compound and, besides, winds up as a waste product. Further, the process is restricted to short-chain amines, and does not appear suitable for rendering CMC hydrophobic.

Generally it is very difficult to have hydrophilic materials such as carboxyl groups-containing polysaccharides (notably CMC) react with hydrophobic materials such as fatty amines. Nonetheless, hydrophobically derivatized polysaccharides are known in the art.

Thus U.S. Pat. No. 4,228,277 (Landoll I) discloses cellulose ethers which have a sufficient degree of nonionic (methyl, hydroxyethyl, hydroxypropyl) substitution to cause them to be water-soluble and further are substituted with a hydrocarbon radical having about 10–24 carbon atoms in an amount between about 0.2 wt % and the amount which renders said cellulose ethers less than 1% soluble in water. Attaching the hydrocarbon radical to the cellulose ether is achieved by reaction with a long chain modifier, which may be an alkyl halide, an epoxide, an isocyanate, an acid, or an acyl halide. The disclosed materials exhibit an improved viscosifying effect, and also some surface activity.

U.S. Pat. No. 4,243,802 (Landoll II) discloses similar cellulose ethers, wherein the amount of $C_{10}$–$C_{24}$ hydrocarbon substitution is such as will render the cellulose ether water-insoluble. These materials are used to effect viscosity increases in solutions of surfactants, or as emulsifiers in aqueous systems.

Similar cellulose ethers, in which the $C_{10}$–$C_{24}$ substituent is an alkylaryl group, are disclosed in U.S. Pat. No. 5,120,838 to Just et al.

Hydrophobe substituted, water-soluble cationic polysaccharides are known from EP 189 935. The quintessence of these materials is that they have a side chain which incorporates one or more quaternary ammonium groups. Next to the quaternary ammonium groups, the side chain may also incorporate a $C_{12}$–$C_{18}$ hydrocarbon chain. The materials are substantially water-soluble and may provide aqueous solutions having enhanced viscosity, foaming, and surface properties. They are disclosed to be useful in personal care, emulsions, and cleansers.

EP 512 319 discloses urethane derivatives of polysaccharides prepared by reacting carbonate groups-containing polysaccharide with a protic nucleophile such as an amine. The carbonate-containing polysaccharide is obtained through the reaction of polysaccharide with phosgene. The disclosure does not pertain to amidation, nor is the process taught recommendable in any manner, as it makes use of hazardous chemicals such as phosgene and pyridine, and the yield is low (about 25%).

EP 566 118 (non-prepublished) discloses the formation of crosslinked polysaccharides. The process taught comprises mixing the polysaccharide with the crosslinking agent in solution, recovering the polysaccharide from the solution, and then heating it to effect crosslinking.

The invention now seeks to provide an amidation process that, in contrast with the process disclosed by Yalpani, is feasible and commercially attractive. The invention also seeks to provide a process that allows rendering the carboxyl-groups containing polysaccharides hydrophobic. Further, the invention is aimed at providing a process by means of which a substantial share of the carboxyl groups can be modified, or at least a process in which nearly all of the added ammonium donor can be incorporated. Particularly, the invention seeks to provide a method of making amide modified carboxyl-containing polysaccharide that is applicable to fatty amines.

To this end, the process of the present invention consists in that in a process for the amidation of a material having at least one carboxyl-containing polysaccharide, in which process the carboxyl groups are reacted with an ammonium donor having the general formula >NH, the reaction is conducted in two subsequent stages, the first stage being reacting the carboxyl groups with the ammonium donor to form the corresponding polysaccharide ammonium salt, and the second step being heating the polysaccharide ammonium salt so as to convert the ammonium groups into the corresponding amido groups.

Using this process, a wide variety of products can be prepared on the basis of carboxyl groups-containing polysaccharides of a different nature (i.e., based on cellulose, starch, guar, or other polysaccharides), different polymer chain lengths (e.g., CMC is available with different degrees of polymerization), and a different anionic character (by virtue of different degrees of carboxyl substitution).

Suitable carboxyl groups-containing polysaccharides include those mentioned in the above-identified Yalpani disclosure, i.e., carboxyl-containing celluloses, notably carboxymethyl cellulose (CMC), starches, notably carboxy methyl starch, guar gums, notably carboxy methyl guar, chitins, chitosans, glycans, galactans, glucans, xanthan gums, alginic acids, polymannuric acids, polyglycosuronic acids, polyglucuronic acids, mannans, dextrins, cyclodextrins, as well as other synthetically carboxylated or naturally occurring carboxylated polysaccharides, which may be linear or branched.

In accordance with the invention it is preferred that the carboxyl groups-containing polysaccharide be selected from the group consisting of carboxymethyl cellulose (CMC), mixed cellulose ethers of CMC such as carboxymethyl hydroxy ethyl cellulose, hydroxy propyl carboxymethyl cellulose (HP-CMC), dihydroxy propyl carboxymethyl cellulose (DHP-CMC), quaternary nitrogen-containing carboxymethyl cellulose (QN-CMC) such as CMC etherified with glycidyl trialkyl ammonium chloride, carboxy methyl ethyl sulfonate cellulose (CM-ESC), methyl carboxy methyl cellulose (M-CMC), carboxy methyl starch (CMS), mixed ethers of CMS such as QN-CMS, carboxy methyl guar (CMG), mixed ethers of CMG such as HP-CMG and QN-CMG, carboxy methyl inuline, and mixed ethers of carboxy methyl inuline. Mixtures of these polysaccharides can also be employed.

The instant carboxyl groups-containing polysaccharides are readily available, or else preparable, e.g. via etherification with monochloro acetic acid. The availability and attainability of carboxyl groups-containing polysaccharides is known to the man of ordinary skill in the art and need not be elucidated here.

The ammonium donor too can be widely varied, which considerably increases the number of products attainable. For instance, the ammonium donors mentioned by Yalpani can be employed. Particularly ammonia and butylamine were successfully used, but also aromatic amines, notably benzylamine, are viable ammonium donor reactants. Mixtures of amines can also be employed, e.g., a mixture of an alcohol amine such as ethanol amine and a fatty amine. Thus, mixed amide carboxymethyl polysaccharides can be formed. Suitable amines further include amino ethyl piperazine, ethanol amine, and di- or polyamines. Examples of the latter kind are ethylene diamine oligomers sold under the tradename "Delamine", such as pentaethylene hexamine.

With regard to the possible use of polyamines, it should be noted that the contents of the aforementioned earlier European patent application publication no. EP 566 118 include the use of polyamine crosslinking agents. This disclosure, however, is confined to crosslinked polysaccharides, while the present invention aims at a plurality of possible modifications. Although the production of crosslinked carboxyl-containing polysaccharide is an option in accordance with the invention in the embodiment in which polyamines are employed as the ammonium donor, the invention is basically aimed at achieving modification of the carboxyl groups, e.g., the incorporation of long hydrocarbon chains, or the incorporation of cationic groups. The crosslinking of carboxyl groups-containing polysaccharides, which can be achieved with a relatively low amount of crosslinking agent, is quite different from achieving modification, which requires the reaction of a substantial share of the carboxyl groups. This result cannot be achieved by means of the process disclosed in EP 566 118, but rather requires the two-step process in which the corresponding carboxyl ammonium salt is formed according to the present invention.

The process is particularly suitable for employing fatty amines. The present method thus provides a solution to the above-indicated problem of reacting hydrophilic and hydrophobic materials in the preparation of hydrophobically modified polysaccharides (in this case fatty amide polysaccharides). For, the reactive moieties of the hydrophilic and hydrophobic molecules have already been coupled by virtue of the relatively simple polysaccharide ammonium salt formation.

Suitable fatty amines for forming the fatty amido groups of fatty amide-modified carboxyl-containing polysaccharides of the present invention generally comprise saturated or unsaturated hydrocarbon groups having of from 8 to 30 carbon atoms. Branched hydrocarbon groups are not excluded, but linear chains are preferred. By preference the fatty radical originates from a $C_{12}$ to $C_{24}$ fatty amine. Fatty amines are known to the man of ordinary skill in the art. Particularly favourable results are obtained if the fatty amine is selected from the group consisting of n-dodecylamine, n-hexadecylamine, n-octadecylamine, cocoamine, tallowamine, hydrogenated tallowamine, oleylamine, N-coco-1,3-diamino propane, N-tallow-1,3-diaminopropane, N-hydrogenated tallow-1,3-diamino propane, N-oleyl-1,3-diaminopropane. Such fatty amines are known under the tradenames Armeen and Duomeen (Akzo Chemicals).

A further means to vary the products attainable by the process of the present invention is controlling the number of carboxyl groups converted into carboxyl ammonium salt. Mostly this conversion will be performed by exchanging sodium (or other salt counter-ions) with the ammonium donor. The degree of exchange is defined as a and indicates the ratio of degree of amine substitution to carboxyl substitution. In the case of fatty amine (FA) and carboxymethyl groups (CM) the following formula applies (with DS being the degree of substitution):

$$0 \leq \alpha = DS_{FA}/DS_{CM} \leq 1$$

This process, i.e., in which a salt, preferably the sodium salt, of the carboxyl-containing polysaccharide is employed is one of the preferred ways of carrying through the first step. It involves dispersing said salt in an aqueous alcoholic medium, i.e., a medium comprising both water and an alcohol, preferably a readily water-miscible alcohol such as ethanol, to form a slurry preferably having a concentration of up to about 50%, and more preferably from about 10 to 40%, adding the ammonium donor, and also an acid, e.g. hydrochloric, sulfuric, nitric, or acetic acid, and diluting the slurry with water. The addition of water has been found to considerably promote the formation of the carboxyl ammonium salt, probably by dissolving the exchanged sodium chloride in the thus water-enriched alcoholic medium, and so shifting the equilibrium in the desired direction. The dissolved salt (NaCl) can be washed out, e.g., during filtration of the polysaccharide ammonium salt.

Suitable alcohols include methanol, ethanol, propanol, iso-propyl alcohol, butanol, t-butyl alcohol, ethylene glycol, propylene glycol, glycerol. Ethers and ketones (e.g. acetone) may also be used.

Another preferred way of carrying through the first step is employing a carboxyl groups-containing polysaccharide in the acid form and simply mixing this with the ammonium donor in the free base form. Available carboxyl group-containing polysaccharides are usually in the form of a salt, which first has to be converted into a free acid (e.g., by addition of and/or washing with an acid such as HCl). An advantage of this method is that pure polysaccharide carboxyl ammonium salt will be obtained without the risk of losses of unreacted amine.

In order to obtain acceptable conversion of the carboxyl ammonium groups into amido groups, the second step should generally involve heating the polysaccharide carboxyl ammonium salt, preferably to a temperature of from about 100° C., preferably about 140° C., to about 250° C. The exact upper limit is determined by the temperature at which the polysaccharide in point starts to decompose. By further preference the temperature is kept below the point at which the polysaccharide starts to undergo the well-known Maillard reaction (about 150° C.), due to which the polysaccharide products turn brown, which usually is undesirable. With an increased temperature the reaction time is shortened considerably. It is preferred to conduct the reaction for a few hours at 140°–150° C.

While several media can be used for heating the polysaccharide quaternary ammonium salt (either wet or dry), including air and nitrogen, the risk of the Maillard reaction occurring is smallest if the heating is conducted in an organic solvent medium, the solvent having an atmospheric boiling point equal to or higher than the temperature employed. Both polar and apolar media have been found to perform well. Polar media like glycol and glycerol may dissolve some types of polysaccharides and polysaccharide ammonium salts having a low $\alpha$ coefficient, which may result in smearing and high viscosities. High $\alpha$ materials, on the other hand, do not dissolve in glycol and glycerol. Which medium is preferred generally depends on the end-use of the product. In many cases the preferred media are apolar solvent (or non-solvents) such as xylene, of which o-xylene has the highest preference by virtue of its high (145° C.) boiling point and because of the possibility to drive off water (originally present and liberated during amidation) by azeotropic destillation, which positively influences the conversion.

During the process of the present invention it is generally desirable to avoid the formation of ester linkages. Ester formation occurs as a side reaction, especially when carboxyl groups in the acid form are present, which may react intramolecularly or intermolecularly with the hydroxyl groups also present in the polysaccharide. Intermolecular ester formation leads to crosslinking, which renders the polysaccharide insoluble, and is objectionable in most cases. However, esters may act as an intermediate in amidation, and the ester linkages formed can be converted into amide when a small excess of amine is used during the amidation. If the ester linkages cannot be completely converted, and if it is desired to get rid of them, an after-treatment with, e.g., equimolar amounts of caustic soda or ammonia is effective.

The formation of ester linkages is not always considered a drawback, and can even be employed to favourable effect on purpose as an alternative way of making the amide modified carboxyl-containing polysaccharides of the present invention. The process in point starts with a free carboxyl groups-containing polysaccharide (obtained, e.g., in the case of CMC by treating commercially available CMC sodium salt with HCl), which is heated to induce ester formation, and thereafter reacted with the ammonium donor. This process is appreciably different from the process involving alkyl chloride disclosed by Grüning in U.S. Pat. No. 4,988, 806.

The invention also pertains to new and useful hydrophobically derivatized polysaccharides obtainable by the process described hereinbefore. The materials found form a new class of amidated carboxyl-containing polysaccharides, which are characterized in that the amidated carboxyl groups are fatty amide groups. The class of hydrophobically derivatized carboxyl groups-containing polysaccharides according to the present invention yields numerous possibilities for varying the constituents of the materials, as well as reaction conditions and media, in order to tailor the materials' properties and so design them for specific purposes. With regard to the specific constituents of these products reference is made to the description provided above.

The preferred materials comprise a polysaccharide selected from the group consisting of carboxymethyl cellulose (CMC), mixed cellulose ethers of CMC, carboxy methyl starch (CMS), mixed ethers of CMS, carboxy methyl guar (CMG), mixed ethers of CMG, and mixtures thereof, and a fatty amine is selected from the group consisting of dodecylamine, tridecylamine, myristylamine, lauryl amine, tallow amine, coco amine, oleyl amine, N-coco-1,3-diamino propane, N-tallow-1,3-diaminopropane, N-hydrogenated tallow-1,3-diamino propane, N-oleyl-1,3-diaminopropane, and mixtures thereof.

The amide modified carboxyl-containing polysaccharides of the present invention, notably the fatty amide derivatives, can be widely employed with advantage.

Thus, the products prepared in accordance with the present invention may be employed in the field of biodegradable plastics. While it is possible to make biodegradable plastics from materials in accordance with the present invention, the most advantageous use in this field is as a biodegradable additive in polymers, e.g. those based an starch. This particularly holds for hydrophobe (fatty amide modified) CM starch or CMC. Such a hydrophobic, starch-compatible additive serves to solve the problem that starch based polymers are too hygroscopic for many applications. The addition of the products of the invention to starch based plastics can also avoid the retrogradation of the starch polymer backbone. The fatty amide modified carboxyl groups-containing polysaccharides of the present invention can also be used to coat the surface of starch based plastics, in order to hydrophobize said surface. Further, fatty amide carboxy methyl starch or fatty amide carboxy methyl cellulose, both of which are insoluble in water, can be dissolved in water which contains a cosolvent (e.g., about 10% of butyl glycol ether). Starch based plastics coated with such a solution display an improved water resistance. The products according to the invention are also useful as a compatibilizer for starch based polymers, i.e., they facilitate the blending of starch based polymers with other polymers, such as polyethylene.

Also, products in accordance with the present invention are viable anti-redeposition agents for synthetic fibres. E.g., CMC is widely employed to prevent soil redeposition on cotton fibers, but is less effective in the case of synthetic fibres. Nonionic cellulose ethers are somewhat better, but still unsatisfactory and also relatively expensive. Products in accordance with the present invention, notably fatty amide modified CMC, display advantageous results as anti-redeposition agents for synthetic fibres. Compared to CMC, they exhibit an increased adsorption capacity onto synthetic fibres. By virtue of their compatibility with liquid detergent formulations, fatty amide modified carboxyl groups-containing polysaccharides such as fatty amide modified CMC can also be used therein as anti-redeposition agents. Furthermore, fatty amide modified polysaccharides, notably CMC, can be used as dispersing agents for zeolites, particularly in concentrated liquid detergent formulations.

The dispersing properties of amide modified carboxyl groups-containing polysaccharides, notably fatty amide modified CMC, can also be put to advantageous use as a pigment dispersant in water based coatings. It is possible to tailor the adsorption of the products of the invention to individual pigments by modifying the carboxyl groups-containing polysaccharide using amines having functional groups that improve the adsorption characteristics, such as benzyl amine or 1-(2-amino ethyl) piperazine.

Further fields of use include polymeric emulsifiers, anti-settling agents, and rheology modifiers, notably for bitumen emulsions, cosmetic applications, associative thickeners, oil drilling fluids, superabsorbers, mineral processing, and a wide variety of other uses.

The invention will be further illustrated with reference to the following unlimitative examples.

EXAMPLE 1

(a) In a one-liter reactor vessel fitted with a stirrer 100 g of Sodium Carboxymethyl Cellulose with a degree of carboxymethylation ($DS_{CM}$) of 0.77 and a moisture content of about 6% were suspended in 200 g of 80% aqueous ethanol. To this suspension were added 16.6 g of Armeen®HTD which is a commercially available mixture (ex Akzo Chemicals) of primary alkyl amines containing 64% $C_{18}$, 31% $C_{16}$ and 5% of $C_{14}$ and $C_{12}$ alkyl amine. Also, an amount of HCl equimolar to the amount of primary amine was added, in this case 19.5 g of a 12% aqueous solution of HCl To dissolve the fatty amine completely the reaction mixture was heated at 40° C. Next, an amount of 150 ml water was added, and the stirring at 40° C. was continued for 1 hour. After cooling, the product was filtered and washed with aqueous ethanol. The nitrogen content of the dry product was determined using the Kjeldahl method for nitrogen analysis and was 0.64% by weight, which corresponds to a degree of carboxyl-fatty ammonium salt substitution for the CMC ($DS_{FAsalt}$) of 0.12.

b) Of the CMC-Fatty Ammonium salt prepared under 1a, 90 g were suspended in 150 ml o-xylene and heated under reflux at 140° C. for 3 hours. After these 3 hours an additional amount of 4 g of Armeen HTD were added to the hot reaction mixture, and the reaction was continued at 140° C. for another 2 hours. After cooling, the mixture was filtered and washed with 50 ml o-xylene and then twice with 50 ml ethanol. The dried product contained 0.06% nitrogen by weight.

(c) As shown by infrared analysis, the product prepared under 1b contained, besides the amide, some residual ester links, which were converted into Sodium Carboxymethyl groups by suspending the product of 1b in 200 ml aqueous ethanol. After the addition of 10 g of a 20% by weight solution of NaOH the mixture was heated at 50° C. for 45 minutes. After cooling and neutralizing, the mixture was filtered, washed with aqueous ethanol, and dried. Some of the reaction parameters and the DSFA are shown in Table 1.

EXAMPLE 2

(a) In a one-liter reactor vessel 100 g of Sodium Carboxymethyl Cellulose with a $DS_{CM}$ of 0.77 and a moisture content of 6 wt % were suspended in 200 g 80% aqueous ethanol. To this suspension were added 88.1 g of the primary alkyl amine named Armeen HTD. Then, with stirring, 108 g of a 12% aqueous solution of HCl were added. After heating the reaction mixture at 40° C., 500 ml water were added, and stirring at 40° C. was continued for 2 hours. Next, the mixture was cooled to room temperature, filtered, and washed with water and then with ethanol. The nitrogen content of the dried CMC-Fatty Ammonium salt was 2.38% by weight, which corresponds to a $DS_{FA}$salt of 0.70.

(b) 150 g of the CMC-Fatty Ammonium salt prepared under 2a were suspended, with stirring, in 500 ml ethylene glycol, and heated at 150° C. for 2 hours. Then an excess amount of 10 g of Armeen HTD was added to the hot reaction mixture, and heating at 150° C. was continued for another 2 hours. After cooling to 50° C., 15 g of a 20wt % NaOH solution were added and stirring was continued for 30 minutes. Thereupon the reaction mixture was filtered and washed with water and then with ethanol. The dried product contained 2.50 wt % nitrogen, which corresponds to a $DS_{FA}$ of 0.72, as is also shown in Table 1.

EXAMPLES 3–5

In these examples products were prepared according to the method of preparation as described in Example 1. The products vary in terms of degree of amidation.

The results of Examples 1–5 are shown in Table 1.

The CMC used for Examples 1–5 is a purified commercial grade produced by the Akzo Chemicals Group (>99% on dry weight) of high molecular weight with a 1% Brookfield viscosity (30 rpm; demin water; 20° C.) of 3000 mPa.s, a $DS_{CM}$ of 0.77, and a moisture content on saponification of 6%.

The amine used in Examples 1–5 is Armeen HTD, which is a commercial product of the Akzo Chemicals Group. The composition of Armeen HTD is mentioned in Example 1.

The amounts of amine and water used for the preparation of the CMC-Fatty Ammonium salt as shown in columns 3 and 4 of Table 1 are based on the use of 100 g of the CMC initially suspended in 200 ml 80 % aqueous ethanol.

For the preparation of the CMC-Fatty Ammonium salt, the amounts of HCl added were equimolar to the amounts of amine.

The amidations of Examples 1, 3, 4, and 5 were performed by refluxing in o-xylene. As shown in Example 2, the amidation of this product was performed in glycol.

TABLE 1

| Example | Amount of Amine (g) | Amount of Water (g) | $DS_{FAsalt}$ | Excess Amine | $DS_{FA}$ | Water Soluble? |
|---|---|---|---|---|---|---|
| 1 | 16.6 | 150 | 0.12 | 0.03 | 0.06 | yes |
| 2 | 88.1 | 500 | 0.70 | 0.09 | 0.72 | no |
| 3 | 56.0 | 500 | 0.42 | 0.04 | 0.33 | no |
| 4 | 5.6 | 130 | 0.03 | 0.015 | 0.021 | yes |
| 5 | 4.2 | 110 | 0.022 | 0.009 | 0.013 | yes |

EXAMPLES 6–11

In order to investigate their rheological behaviour, a series of products, the characteristics of which are shown in Table 2, was prepared according to the method of preparation as described in Example 1.

The CMC used for the preparation of these products is the same as used in Examples 1–5. The amine used is Armeen CD, a commercial product of the Akzo Chemicals Group, which is a mixture of primary alkyl amines containing 6% $C_8$, 6% $C_{10}$, 50% $C_{12}$, 19% $C_{14}$, 10% $C_{16}$, and 10% $C_{18}$ alkyl amine.

TABLE 2

| Example | N content (wt %) | $DS_{FA}$ | $DS_{FA}/DS_{CM}$ (α) | Water Soluble? |
|---|---|---|---|---|
| 6 | 2.05 | 0.46 | 0.60 | no |
| 7 | 0.46 | 0.08 | 0.10 | yes |
| 8 | 0.29 | 0.051 | 0.066 | yes |
| 9 | 0.071 | 0.012 | 0.016 | yes |
| 10 | 0.046 | 0.008 | 0.010 | yes |
| 11 | 0.015 | 0.003 | 0.004 | yes |

The viscosity of the products of Examples 8–11 was measured as a function of the shear rate, and it was found that in aqueous solution the products displayed more pseudo-plastic behaviour with increasing hydrophobic content. These results are given in Table 3, which is a tabular representation of the rheogram obtained with these measurements.

TABLE 3

| Shear rate | Viscosity (log mPa.s) Example: | | | |
|---|---|---|---|---|
| (1000/s) | 8 | 9 | 10 | 11 |
| 0.00001 | 2.742 | 2.849 | 3.626 | 5.770 |
| 0.0001 | 2.742 | 2.795 | 3.572 | 5.234 |
| 0.001 | 2.715 | 2.768 | 3.465 | 4.403 |
| 0.01 | 2.608 | 2.634 | 3.090 | 3.572 |
| 0.1 | 2.340 | 2.366 | 2.661 | 2.902 |
| 1 | 1.911 | 1.938 | 2.098 | 2.286 |

EXAMPLES 12–15

(a) 50 g of a purified NaCMC with a 1% Brookfield viscosity of 100 mPa.s (30 rpm; demin water; 20° C.) and a DSCM of 0.56 and a moisture content of 6% were suspended in 150 ml 80% aqueous ethanol in an one-liter reactor vessel. To this suspension a 100 g 50 wt % Armeen CD-HCl alkyl ammonium salt solution in ethanol was added. Then 800 ml of water were added, and stirring at room temperature was continued for 2 hours. The product was filtered and washed with water and then with ethanol. The dry product contained 2.55 wt % nitrogen, which corresponds to an a of 0.98.

(b) The CMC-Fatty Ammonium salt prepared under 12a was heated in a furnace at 145° C. for 4 hours. Then the product was suspended in 300 ml 70% aqueous ethanol which contained a small amount of caustic soda. After heating at 50° C. for 1 hour, the mixture was filtered and washed with 70% aqueous ethanol and then with pure ethanol. The nitrogen content of the dry Fatty Amide CMC was 2.48 wt %.

Using the same NaCMC and the same Amine coupled in different ratios according to the method of Example 12, the products shown in Table 4 were prepared. For each example initially 50 g of the CMC were suspended in 150 ml 80% aqueous ethanol.

TABLE 4

| Example | Amount of 50 wt % amine-HCl (g) | Amount of water (g) | $DS_{FA}$ | $DS_{FA}/DS_{FC}$ (α) |
|---|---|---|---|---|
| 13 | 100 | 1000 | 0.55 | 0.98 |
| 14 | 50 | 250 | 0.21 | 0.37 |
| 15 | 10 | 125 | 0.017 | 0.03 |
| 16 | 5 | 75 | 0.006 | 0.01 |

EXAMPLE 16

(a) 100 g of a purified NaCMC with a 1% Brookfield viscosity of 2000 mPa.s (30 rpm; demin water; 20° C.), a DSCM of 0.98, and a moisture content of 6% were suspended in 400 ml 70% aqueous ethanol. To this suspension 100 g of a 20% HCl solution were added. After stirring for 30 minutes, the suspension was filtered and washed with 20 g of a 20% HCl solution and then twice with 250 ml 70% aqueous ethanol.

(b) The HCMC as produced under 16a was suspended in 150 ml 90% aqueous ethanol. Then 70 g of pentaethylene hexamine (PEHA) were added, and stirring was continued for 1 hour. After filtration and washing with aqeuous ethanol, the product was dried. The weight of the dry product was 126 g.

(c) The product prepared under 16b was refluxed in 300 ml o-xylene for 3 hours. After the addition of 25 g PEHA the reflux was continued for another 1.5 hours. Then the product was filtered and washed with ethanol and acetone.

EXAMPLE 17

(a) 50 g of a Sodium Carboxymethyl Starch with a DSCM of 0.25 were suspended in 100 ml 80% aqueous ethanol. To this suspension 40 g of a 50 wt % Armeen CD-HCl solution were added. After stirring for 2 hours at room temperature, the reaction mixture was filtered and washed with 80% aqueous ethanol. The nitrogen content of the dried product was 1.28 wt %.

(b) The CMS-Fatty Ammonium salt prepared under 17a was suspended in 100 ml o-xylene and refluxed for 3 hours. After filtration and washing, the ester bonds present in the product were converted into Sodium Carboxymethyl groups by a mild treatment with caustic soda. The nitrogen content of the purified product was 0.96 w %, which corresponds to an a of 0.64.

EXAMPLE 18

(a) To a suspension of 50 g of a CMC with a DSCM of 0.77, a moisture content of 6%, and a 1% Brookfield viscosity of 3000 mPa.s (30 rpm; demin water; 20° C.) in 200 ml 80% aqueous ethanol 12 g of a concentrated HCl solution were added. After filtration and washing with 80% aqueous ethanol, the wet product was vacuum dried for 5 hours at 140° C.

(b) The crosslinked CMC-ester prepared under 18a was suspended in 150 ml o-xylene. After the addition of 75 g Armeen CD the mixture was refluxed for 3 hours at 140° C. Then the mixture was filtered and washed with o-xylene and ethanol. The infrared spectrum of the dried product showed the amide bond at 1655 cm$^{-1}$ and the nitrogen content of the product was 2.05 wt %, which corresponds to a $DS_{FA}$ of 0.44.

EXAMPLE 19

500 g of a purified NaCMC with a 1% Brookfield viscosity of 800 mPa.s (30 rpm; demin water; 20° C.), a DSCM of 0.74, and a moisture content of 6% were suspended in 1.5 l 75% aqueous ethanol. During stirring of this suspension at room temperature 21.3 g HCl (36%) diluted with 100 ml water were added. After stirring for one hour, the slurry was filtered and washed with 500 ml 75% aqueous ethanol. Then the wet NaHCMC was mixed with 500 ml 96% ethanol which contained 68.2 g Duomeen HT. Mixing was continued for 2 hours at 50° C., after which the ethanol/water was evaporated using vacuum. The wet product was then dried and amidated at 150° C. for 5 hours in a furnace. The $DS_{FA}$ of the product as calculated from the nitrogen content of a purified sample was 0.07.

What is claimed is:

1. A process for the amidation of a carboxyl groups-containing polysaccharide to produce a hydrophobic amide group-containing polysaccharide wherein the carboxyl groups are converted into amido groups by reaction with an ammonium donor having the general formula >NH, wherein the reaction is conducted in two subsequent steps, the first step being reacting the carboxyl groups with the ammonium donor to form the corresponding polysaccharide carboxyl ammonium salt, and the second step being heating the polysaccharide carboxyl ammonium salt at a temperature of from about 100° C. to the temperture at which the polysaccharide starts to decompose so as to convert the carboxyl ammonium salt groups into the corresponding amido groups.

2. The process according to claim 1 wherein the first step comprising: (a) dispersing a salt of the carboxyl-containing polysaccharide in an aqueous alcoholic medium to form a slurry having a concentration of 5%–50% by weight; (b) adding the ammonium donor and acid; and (c) diluting the slurry with water.

3. The process according to claim 1 wherein the first step comprises mixing a free carboxyl groups-containing polysaccharide in the free base form with the ammonium donor.

4. The process according to claim 1 wherein the second step comprises heating the polysaccharide carboxyl ammonium salt at a temperature of from about 140° C. to about 150° C.

5. The process according to claim 4 wherein the heating is conducted in an organic solvent medium, the solvent having an atmospheric boiling point equal to or higher than the temperature employed.

6. The process according to claim 4 wherein the ammonium donor is selected from the group consisting of fatty amines, benzyl amine, amino ethyl piperazine, alcohol amines, diamines, polyamines, and mixtures thereof.

7. The process according to claim 1 wherein the ammonium donor is selected from the group consisting of fatty amines, benzyl amine, amino ethyl piperazine, alcohol amines, diamines, polyamines, and mixtures thereof.

8. A process for the preparation of fatty amide-modified carboxymethyl cellulose (CMC) comprising the following steps:

reacting CMC or a salt thereof with a fatty amine to form the corresponding CMC-carboxyl fatty ammonium salt; and heating the CMC-carboxyl fatty ammonium salt to a temperature of from about 120° C. to about 150° C. to convert the ammonium groups into the corresponding amido groups.

9. The process according to claim 8 wherein the first step comprises (a) dispersing a carboxymethyl cellulose (CMC) alkali salt in an aqueous alcoholic medium to form a slurry having a concentration of about 10%–40% by weight;

(b) adding the fatty amine and strong mineral acid to form the corresponding CMC-carboxyl fatty ammonium salt; and (c) diluting the slurry with water; and wherein the second step involves heating the CMC-carboxyl fatty ammonium salt in xylene.

* * * * *